(12) United States Patent
Aoki (10) Patent No.: US 8,311,223 B2
(45) Date of Patent: Nov. 13, 2012

(54) COMMUNICATION SYSTEM, COMMUNICATION APPARATUS, DISPLAY DEVICE, AND COMMUNICATION METHOD

(75) Inventor: Norihito Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1423 days.

(21) Appl. No.: 11/858,563

(22) Filed: Sep. 20, 2007

(65) Prior Publication Data

US 2008/0075289 A1 Mar. 27, 2008

(30) Foreign Application Priority Data

Sep. 22, 2006 (JP) ................................. 2006-257702

(51) Int. Cl.
*H04L 9/00* (2006.01)
(52) U.S. Cl. ........................................ 380/277; 713/171
(58) Field of Classification Search .................. 380/277; 710/5, 56; 370/338
See application file for complete search history.

(56) References Cited

U.S. PATENT DOCUMENTS

| 2005/0099962 | A1* | 5/2005 | Matsuda ....................... 370/254 |
| 2006/0149858 | A1* | 7/2006 | Bhesania et al. .................. 710/5 |
| 2007/0038784 | A1* | 2/2007 | Sung et al. ....................... 710/56 |
| 2007/0160201 | A1* | 7/2007 | Blom et al. ..................... 380/30 |
| 2007/0189244 | A1* | 8/2007 | del Prado Pavon et al. .. 370/338 |

FOREIGN PATENT DOCUMENTS

JP 2006-054535 A 2/2006

OTHER PUBLICATIONS

S. M Mishra, Detect and Avoid: An Ultra-Wideband/WiMax; Year 2006; IEEE; pp. 1-7.*
Wireless Universal Serial Bus Specification, Revision 1.0, May 12, 2005, pp. 1-303, Agere Systems, Inc., Hewlett-Packard Co., Intel Corp., Microsoft Corp., NEC Corp., Koninklijke Philips Electronics Co. Ltd.
Association Models Supplement to the Certified Wireless Universal Serial Bus Specification, Revision 1.0, Mar. 2, 2006, pp. 1-28, Agere Systems, Inc., Hewlett-Packard Co., Intel Corp., Microsoft Corp., NEC Corp., Koninklijke Philips Electronics Co. Ltd.
Wireless Universal Serial Bus Specification, Revision 2.0, Apr. 27, 2000, pp. 1-650, Compaq Computer Corp., Hewlett-Packard Co., Intel Corp., Lucent Technologies Inc., Microsoft Corp., NEC Corp., Koninklijke Philips Electronics Co. Ltd.
Preston Hunt, "Certified Wireless USB Association Models Supplement 1.0".
Abdul R. Ismail,"Certified Wireless USB Wire Adapter Model".

* cited by examiner

*Primary Examiner* — Saleh Najjar
*Assistant Examiner* — Monjour Rahim
(74) *Attorney, Agent, or Firm* — Canon USA Inc. IP Division (57) ABSTRACT

A communication system includes determining whether first integrity information of a first encryption key is true or false, performing communication by using a first secret key corresponding to the first encryption key when the first integrity information is true, displaying second integrity information of a second encryption key, determining whether the second integrity information is true or false, and performing communication by using a second secret key corresponding to the second encryption key when the second integrity information is true.

10 Claims, 7 Drawing Sheets

COMMUNICATION SYSTEM, COMMUNICATION APPARATUS, DISPLAY DEVICE, AND COMMUNICATION METHOD

BACKGROUND OF THE INVENTION

1. Field of the Invention

The present invention relates to a communication system, a communication apparatus, a display apparatus, and a communication method.

2. Description of the Related Art

According to a WUSB (Wireless Universal Serial Bus) 1.0 specification, in data communication between a host and a device, use of an encryption based on a secret key is defined. Two types of secret key exchange methods employed in the WUSB 1.0 specification is defined in the WUSB Association 1.0 specification.

One method is an exchange of a secret key based on a public key cryptosystem through a wireless communication and the other method is an exchange of a secret key through a wired communication. The former method is referred to as Numeric Model, as numerals are derived for confirming the integrity of the secret key during a secret key derivation. The latter method is referred to as Cable Model, as a cable is used for realizing a USB 2.0 host-device communication by using a USB (Universal Serial Bus) 2.0 specification. According to the WUSB Association 1.0 specification, the WUSB host must have implementation of both the methods and the WUSB device must have at least one of the above-described methods.

The Numeric Model provides for an improvement in usability as it is possible to exchange the secret key through the wireless communication. However, it is necessary to provide a display apparatus for displaying the numerals. The Cable Model is based on reliable secret key exchange, as the communication is performed by using a cable with a USB 2.0 host/device controller but the controller and the connector need to be implemented.

The WUSB 1.0 specification defines a DWA (Device Wire Adapter) and also the WUSB Association 1.0 specification is applied to the DWA.

The DWA must use one of two Association Models. However, when the Numeric Model is used, a display apparatus needs to be implemented in the DWA and the display apparatus increases the costs. Also, implementation of the display apparatus complicates the configuration and it is difficult to achieve miniaturization.

When the Cable Model is used, the secret key exchange method becomes simple and reliable. On the other hand, the USB 2.0 device controller for a connection to the WUSB host and a connector for an external connection increase the costs.

SUMMARY OF THE INVENTION

According to an aspect to the present invention, a communication system includes a control apparatus, a communication apparatus, and a display apparatus. The control apparatus includes a first true or false determination unit configured to determine whether a first integrity information of a first encryption key is true or false, and a first communication unit configured to perform communication by using a first secret key corresponding to the first encryption key when the first integrity information is true. The communication apparatus includes a display control unit configured to display a second integrity information of a second encryption key on the display apparatus, a second true or false determination unit configured to determine whether the second integrity information is true or false based on notification from the display apparatus, and a second communication unit configured to perform communication by using a second secret key corresponding to the second encryption key when the second integrity information is true. The display apparatus includes a display unit configured to display the second integrity information notified from the communication apparatus, an input unit configured to input determination information corresponding to a determination result of the second integrity information; and a transmission unit configured to transmit the determination result of the second integrity information in accordance with an input through the input unit to the communication apparatus.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the attached drawings.

Figure 1:
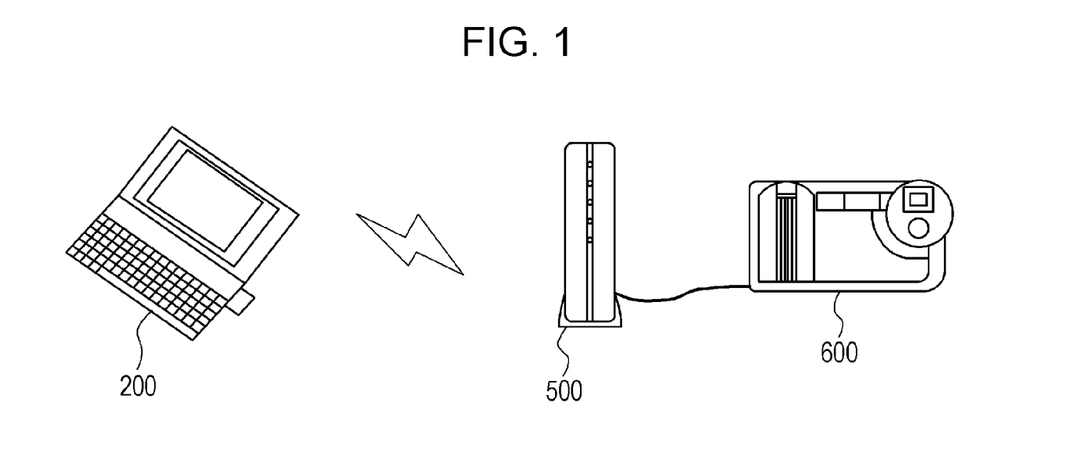
FIG. 1 is a system configuration diagram illustrating a system composed of a WUSB host, a DWA, and a DSC that is a USB 2.0 device for describing the present invention.

FIG. 1 illustrates a system configuration of a system composed of a WUSB host 200, a DWA 500, and a DSC 600 functioning as a USB 2.0 device. The WUSB host 200 is an information apparatus such as a personal computer. The DWA 500 is a DWA defined in the WUSB 1.0 specification and is an adapter that is connected to another apparatus via a wire and provides a wireless communication function to the connected apparatus. The DSC 600 is a digital still camera. It is noted that the DSC 600 is an example of the USB 2.0 device and the system can be realized by other apparatuses having a display apparatus and an input apparatus, for example, a mobile phone, etc.

Figure 2:
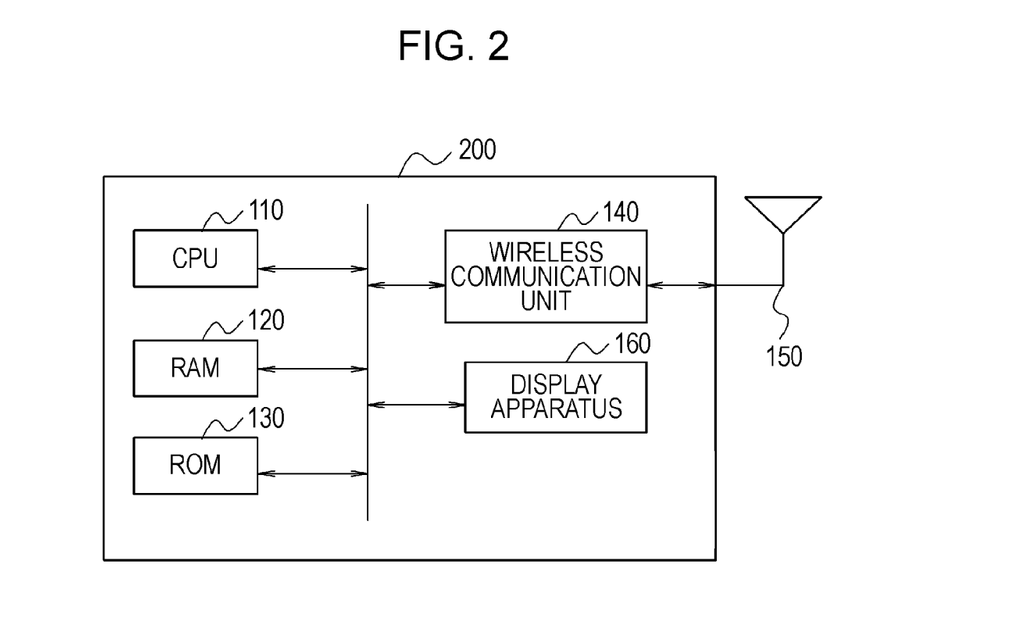
FIG. 2 illustrates a configuration of the WUSB host for describing the present invention.

FIG. 2 illustrates a configuration of the WUSB host 200. A CPU (Central Processor Unit) 110 performs data processing. The CPU 110 performs various controls, described below, in accordance with a program stored in a ROM 130. A RAM (Random Access Memory) 120 stores temporal data. The ROM (Read Only Memory) 130 stores the program. A wireless communication unit 140 includes a transmission and reception function based on a wireless communication. Denoted by reference numeral 150 is an antenna. A display apparatus 160 displays integrity information of a public key PKH (Public Key by Host) generated by a host using at least Numeric Model. A communication between the WUSB host 200 and the DWA 500, described below, is performed through a wireless communication via a wireless communication unit 140.

Figure 3:
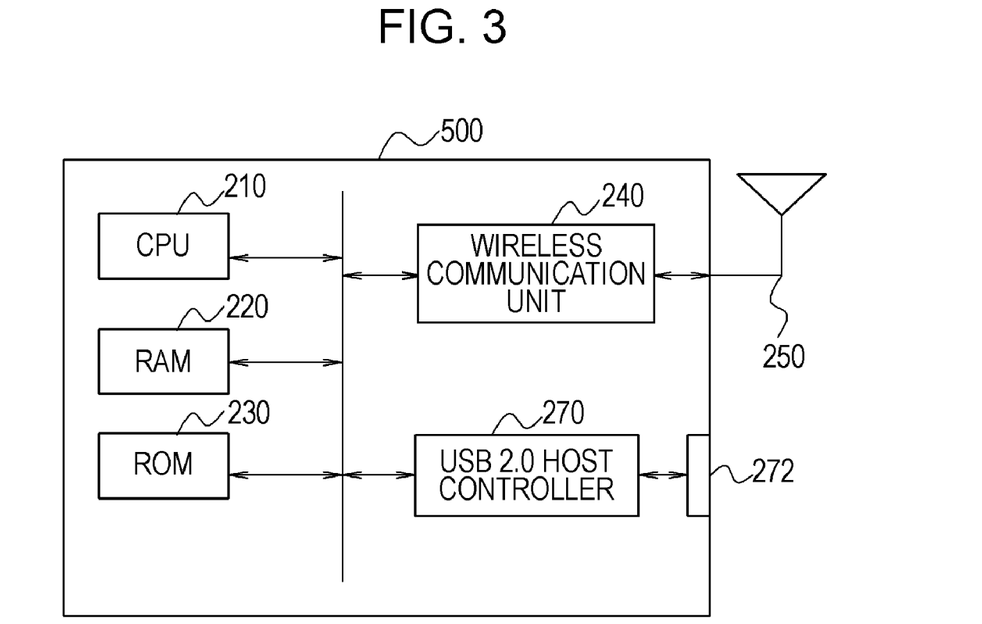
FIG. 3 illustrates a configuration of the DWA for describing the present invention.

FIG. 3 illustrates a configuration of the DWA 500 according to a first exemplary embodiment of the present invention. A CPU 210 performs data processing. The CPU 210 performs various controls described below in accordance with a program stored in a ROM 230. A RAM 220 stores temporal data. The ROM 230 stores the program. A wireless communication unit 240 includes a transmission and reception function based on a wireless communication. Denoted by reference numeral 250 is an antenna.

A USB 2.0 host controller 270 controls the USB 2.0 device connected in down stream. An A socket connector 272 is used for an external connection. A communication between the WUSB host 200 and the DWA 500, described below, is performed through a wireless communication via a wireless communication unit 240. In addition, a communication between the DWA 500 and the DSC 600 is performed through a USB cable connected to the A socket connector 272 in accordance with a control of the USB 2.0 host controller 270.

Figure 4:
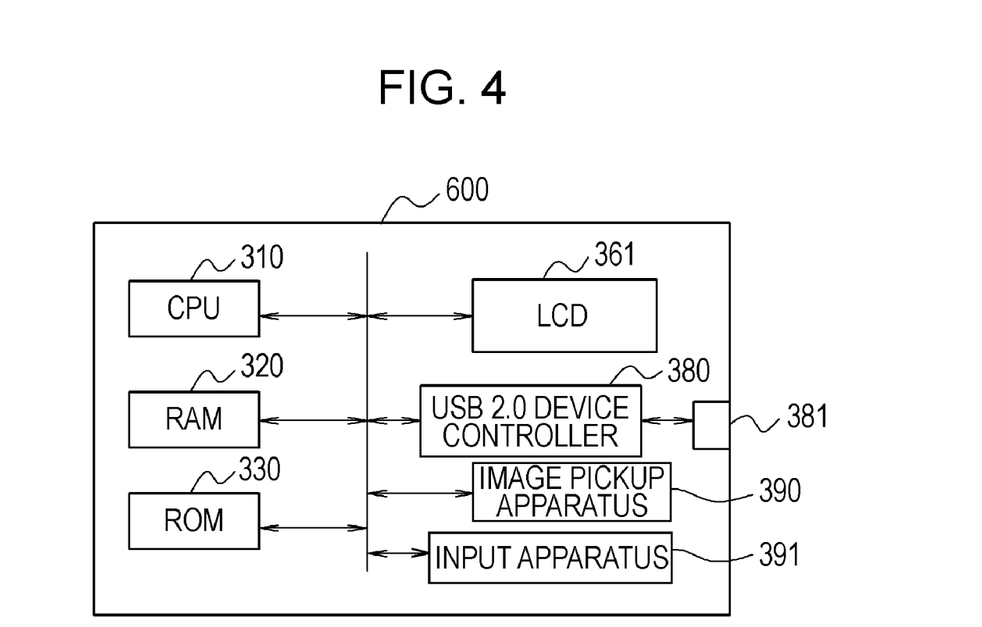
FIG. 4 illustrates a configuration of the DSC for describing the present invention.

FIG. 4 illustrates a configuration of the DSC 600. A CPU 310 performs data processing of the DSC 600. The CPU 310 performs various controls, described below, in accordance with a program stored in a ROM 330. A RAM 320 stores temporal data. The ROM 330 stores the program. An LCD (Liquid Crystal Display) 361 displays integrity information of a public key at least received from the DWA. A USB 2.0 device controller 380 is used for a connection to the DWA as the USB 2.0 device. A B socket connector 381 is used for an external connection. An image pickup apparatus 390 picks up an image. An input apparatus 391 is used by a user to operate the DSC 600. A communication between the DWA 500 and the DSC 600 is performed through a USB cable connected to the B socket connector 381 in accordance with a control of the USB 2.0 device.

Figure 5:
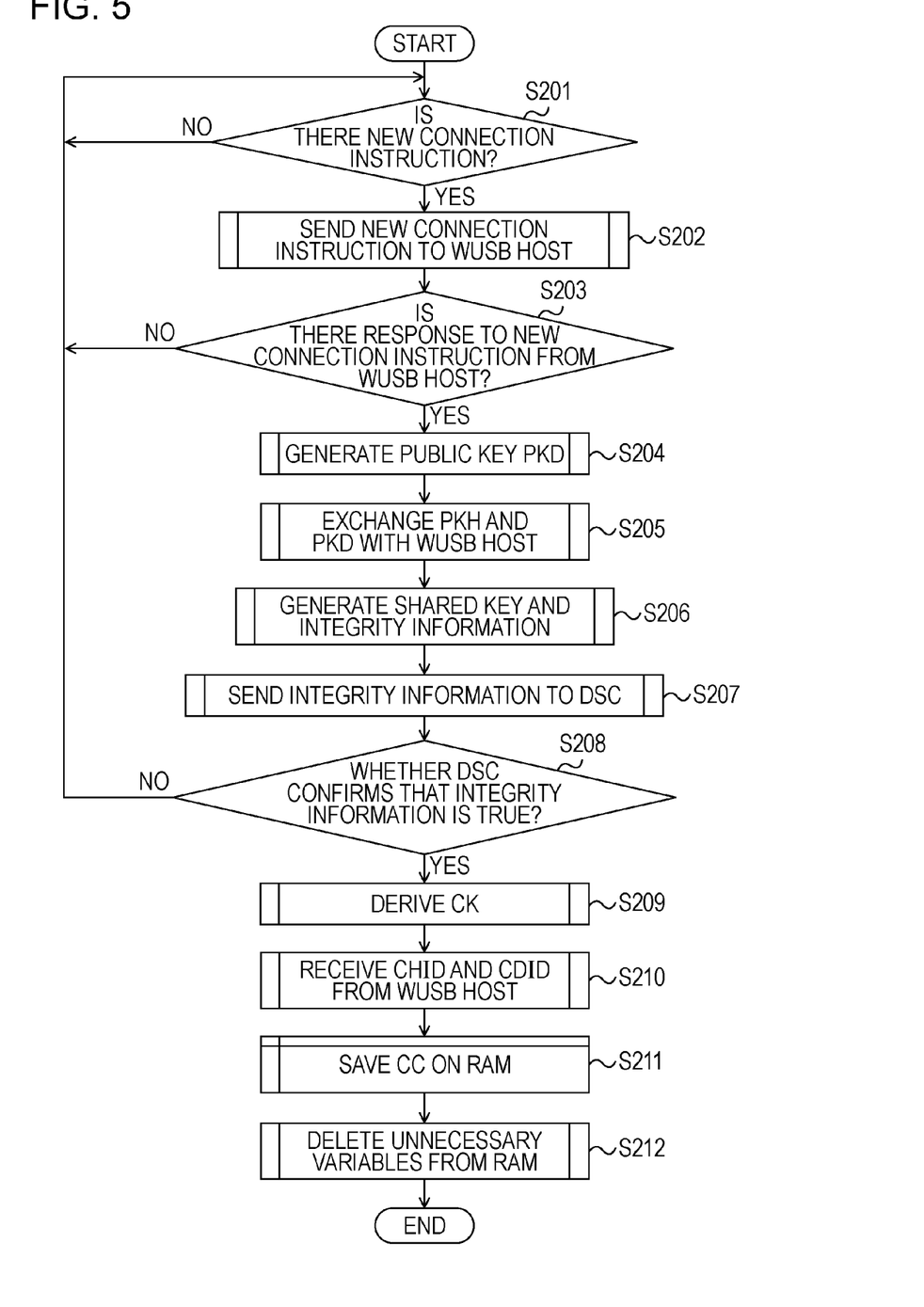
FIG. 5 is a flowchart illustrating operations of the DWA for describing the present invention.

FIG. 5 is a flowchart illustrating operations of the DWA 500 according to the present embodiment. The flowchart of FIG. 5 is executed in accordance with the control of the CPU 21.

In step S201, the DWA 500 determines whether a new connection instruction is issued by a user. When the new connection instruction is issued by the user, the process advances to step S202 and when the new connection instruction is not issued, the process returns to step S201 again. In step S202, the DWA 500 sends the new connection request to the WUSB host 200.

In step S203, the DWA 500 determines whether a response to the new connection request is returned from the WUSB host 200. When the response is returned, the process advances to step S204, and when the response is not returned, the process returns to step S201. In step S204, the DWA 500 generates a public key PKD (Public Key by Device). In step S205, the DWA 500 and the WUSB host 200 notify each other of a public key PKH generated by the WUSB host 200 and the PKD generated by the DWA 500 for exchange.

In step S206, the DWA 500 uses the PKD generated by itself and the exchanged PKH to generate a shared key and also integrity information for validating the shared key. In step S207, the DWA 500 sends the integrity information as well as a display request of the integrity information generated in step S206 to the DSC 600.

In step S208, the DWA 500 determines whether the integrity information is true in the DSC 600 based on a confirmation signal sent from the DSC 600. When the integrity information is true, the process advances to step S209, and when the integrity information is not true, the process returns to step S201.

In step S209, the DWA 500 derives CK (Connection Key) by using the shared key generated in step S206. In step S210, the DWA 500 receives CHID (Connection Host ID) and CDID (Connection Device ID) from the WUSB host 200. In step S211, the DWA 500 sets the CK, the CHID, and the CDID obtained in steps S210 and S211 as information set of a secret key and saves the set as CC (Connection Context) in the RAM 220. In step S212, as variables used during the course of deriving the CC are unnecessary, the DWA 500 deletes the variables from the RAM 220. After that, at the time of a communication with the WUSB host 200, the DWA 500 uses the CC saved in the RAM 220 to perform an encryption communication with the WUSB host 200.

Figure 6:
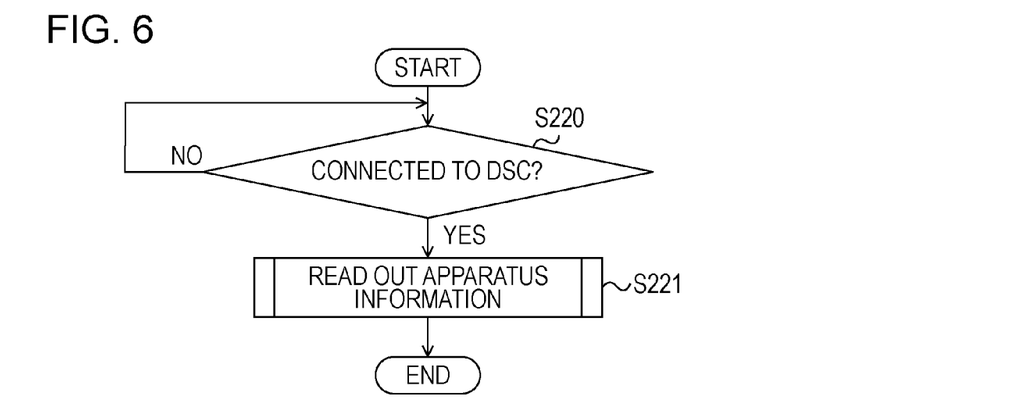
FIG. 6 is a flowchart illustrating operations in which the DWA recognizes the DSC for describing the present invention.

FIG. 6 is a flowchart illustrating operations executed in accordance with the control of the CPU 21 in which the DWA 500 recognizes the DSC 600.

In step S220, the DWA 500 determines whether a connection to the DSC 600 is established. When the connection is not established, the process returns to step S220, and when the connection is established, the process advances to step S221. In step S221, the DWA 500 reads connected apparatus information of the DSC 600 to read a character type that can be displayed at least through an external input. The processes from steps S220 to S221 may be inserted between any steps from S201 to S207 of FIG. 5.

Figure 7:
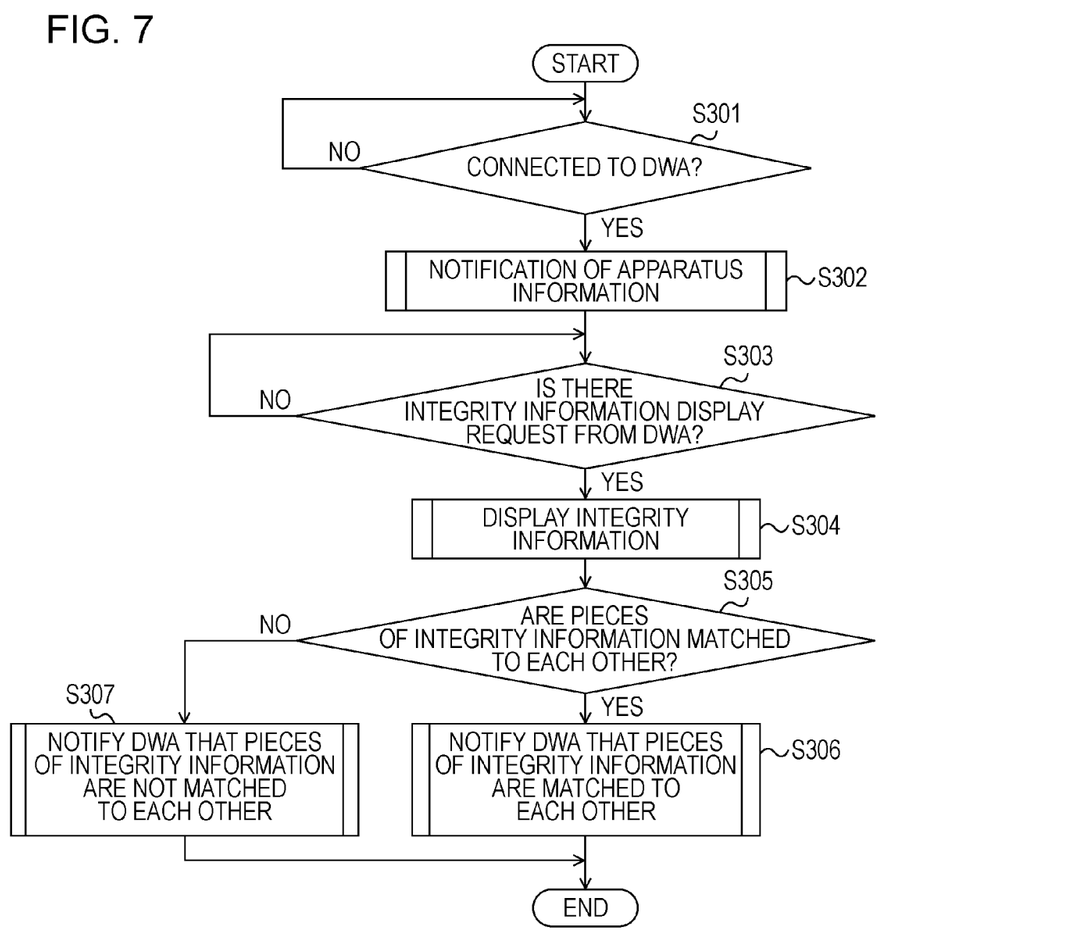
FIG. 7 is a flowchart illustrating operations of the DSC for describing the present invention.

FIG. 7 is a flowchart illustrating operations of the DSC 600 executed in accordance with a control of the CPU 310.

In step S301, the DSC 600 determines whether a connection to the DWA 500 is established. When the connection is not established, the process returns to step S301, and when the connection is established, the process advances to step S302. In step S302, the DSC 600 informs the DWA 500 of apparatus information while notifying DWA 500 of a character type that can be displayed at least through an external input.

In step S303, the DSC 600 determines whether or not there is a display request for integrity information from the DWA 500. When there is no display request for the integrity information, the process returns to step S303, and when there is a display request for the integrity information, the process advances to step S304.

In step S304, the DSC 600 displays the integrity information received from the DWA 500 on the LCD 361. The user confirms whether the integrity information displayed on the LCD 361 matches the integrity information displayed on the display apparatus 160 of the WUSB host 200 and inputs a confirmation result through the input apparatus 391.

In step S305, the DSC 600 determines whether the integrity information matches the integrity information displayed on the WUSB host 200 side based on the determination information input through the input apparatus 391. When the pieces of the integrity information match to each other, the process advances to step S306, and when the pieces of the integrity information do not match to each other, the process advances to step S307.

In step S306, the DSC 600 notifies the DWA 500 that the pieces of the integrity information match to each other by way of a confirmation signal. On the other hand, in S307, the DSC 600 notifies the DWA 500 that the pieces of the integrity information do not match to each other by way of a confirmation signal. It is noted that herein the DWA 500 is notified by way of a confirmation signal when the pieces of the integrity information match or do not match to each other.

The DWA 500 may be notified by way of a confirmation signal when the pieces of the integrity information match to each other. In this case, the DWA 500 determines that the pieces of the integrity information do not match to each other when no confirmation signal is sent from the DSC 600, even if a certain period of time elapses after the integrity information display is requested to the DSC 600.

Figure 8:
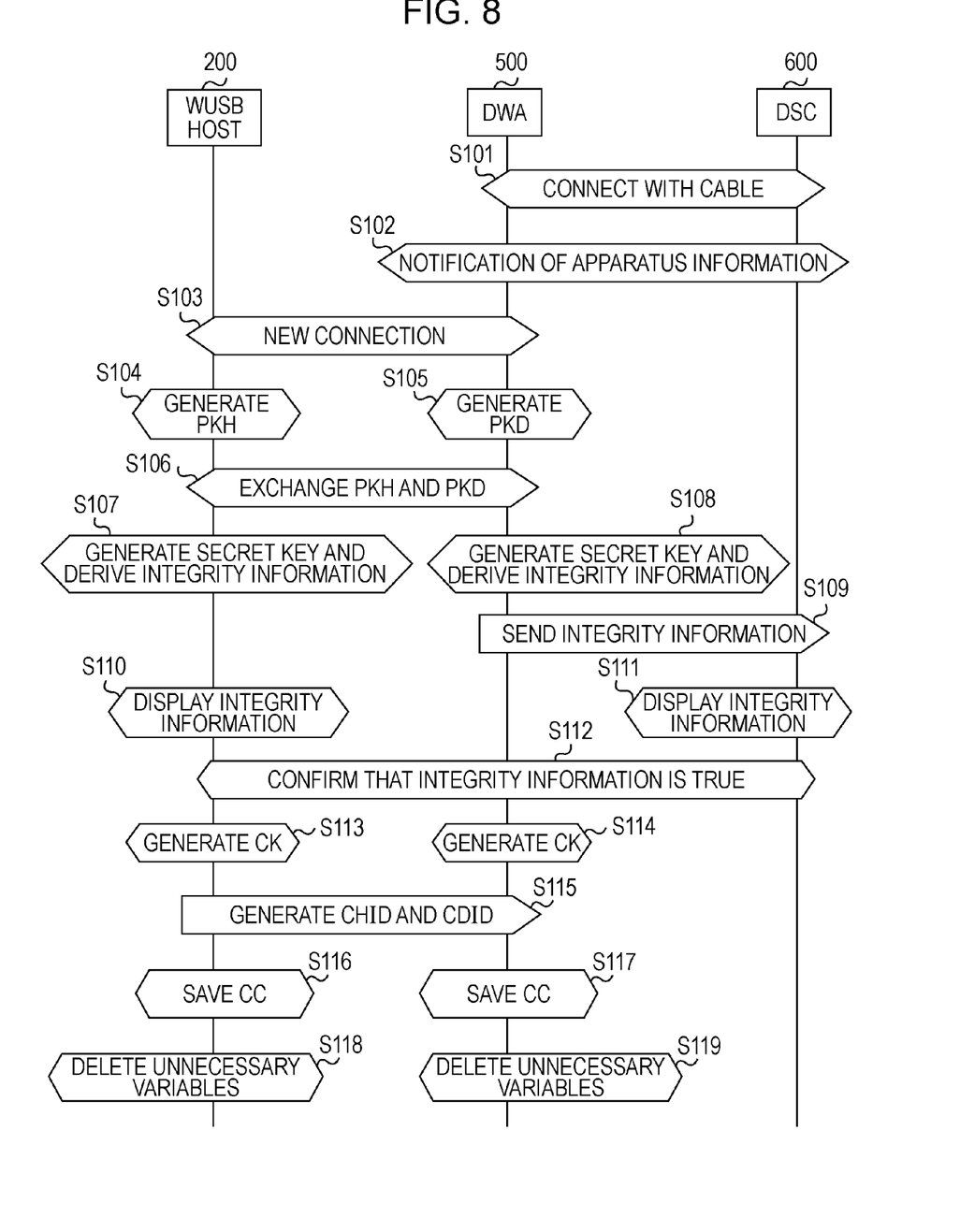
FIG. 8 is a sequence chart in which the DWA and the DSC perform Association with the WUSB host for describing the present invention.

FIG. 8 is a sequence chart in which the DWA 500 and the DSC 600 perform Association with the WUSB host 200.

In step S101, the user connects the USB 2.0 host controller 270 of the DWA 500 to the USB 2.0 device controller 380 of the DSC 600 via a cable. In step S102, the USB 2.0 host controller 270 of the DWA 500 identifies the USB 2.0 device controller 380 of the DSC 600. At this time, the USB 2.0 host controller 270 of the DWA 500 reads character information that can be displayed at least through an external input by the DSC 600 and stores the information in the RAM 220.

In step S103, the DWA 500 searches for the WUSB host 200 whose connection is allowed and performs a new connection request by using the wireless communication unit 240. The WUSB host 200 permits the new connection in accordance with the new connection request. In step S104, the WUSB host 200 generates a public encryption key PKH. On the other hand, in step S105, the DWA 500 generates a public encryption key PKD. In step S106, the WUSB host 200 and the DWA 500 exchange the PKD and the PKH with each other.

In step S107, the WUSB host 200 generates a secret key (shared key) by using the PKD and the PKH and derives the integrity information. Similarly, in step S108, the DWA 500 generates a secret key (shared key) by using the PKH and the PKD and derives the integrity information.

In step S109, the DWA 500 sends the integrity information based on the apparatus information of the display apparatus (the DSC 600 or the LCD 361 of the DSC 600) obtained in step S102 to the DSC 600. In step S110, the WUSB host 200 displays the integrity information by using the display apparatus 160. Similarly, in step S111, the DSC 600 displays the integrity information by using the LCD 361.

In step S112, the user confirms whether the pieces of the integrity information displayed on the WUSB host 200 and the DSC 600 are true. The user inputs whether the pieces of the integrity information displayed on the WUSB host 200 and the DSC 600 are true (matched to each other) by operating an operation unit (not shown) of the WUSB host 200 and the input apparatus 391 of the DSC 600. In the example of FIG. 8, the user inputs that the pieces of the integrity information in both the WUSB host 200 and the DSC 600 are true.

Then, the DSC 600 sends a confirmation signal that the pieces of the integrity information are true to the DWA 500. In step S113, when it is determined that the pieces of the integrity information are true based on the user input, the WUSB host 200 generates a CK by using the shared key derived in step S107. Then, in step S114, the DWA 500 generates a CK by using the shared key derived in step S108. In step S115, the WUSB host 200 generates a CHID and a CDID and notifies the DWA 500 of the CHID and the CDID.

In step S116, the WUSB host 200 temporarily stores a CC in its RAM 120 and uses the CC for data encryption and data decryption in an encryption communication with the DWA 500. In step S117, the DWA 500 temporarily stores a CC in its RAM 220 and uses the CC for data encryption and data decryption in the encryption communication with the WUSB host 200. In steps S118 and S119, the WUSB host 200 and the DWA 500 delete variables used during the course of deriving the secret key.

As described above, according to the present embodiment, it is possible to perform the secret key exchange based on the Numeric Model of the WUSB without providing a display unit to the DWA 500. Therefore, the configuration of DWA can be simplified and the costs can be reduced. In addition, as it is unnecessary to provide a display unit to the DWA, the DWA can be miniaturized.

That is, by adding a cooperation function between a communication apparatus having no display apparatus and an external display apparatus connected to the communication apparatus, it is possible to cope with the Numeric Association model without mounting the display apparatus to the communication apparatus. With this configuration, cost reduction can be achieved while improving the usability of the wireless connection. In addition, the configuration of the apparatus can be simplified and also miniaturized.

Furthermore, it is unnecessary to mount a USB 2.0 device controller for the Cable Model and an up stream connector, thus also reducing cost.

Figure 9:
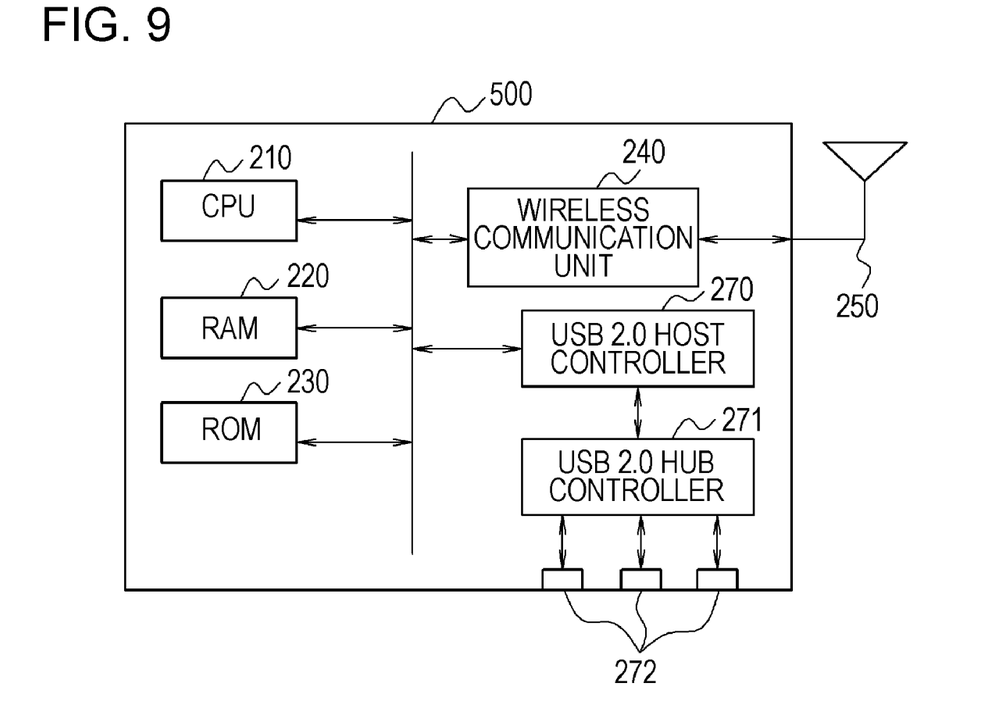
FIG. 9 illustrates a configuration of the DWA for describing the present invention.

FIG. 9 illustrates a configuration of the DWA 500 according to a second exemplary embodiment of the present invention. A CPU 210 performs data processing. The RAM 220 stores temporal data. The ROM 230 stores the program. The wireless communication unit 240 includes a transmission and reception function based on a wireless communication. Denoted by reference numeral 250 is an antenna.

The USB 2.0 host controller 270 controls a downstream USB 2.0 device. A USB 2.0 hub controller 271 provides a control function and a connection function for a plurality of down stream ports. The A socket connector 272 is used for an external connection.

In the DWA 500 illustrated in FIG. 9, the USB 2.0 hub controller 271 is added to the configuration of FIG. 3. Other configurations and operations of the DWA 500 are similar to those of the first exemplary embodiment. The program stored in the ROM 230 is a program for executing the flowchart of FIG. 10.

Figure 10:
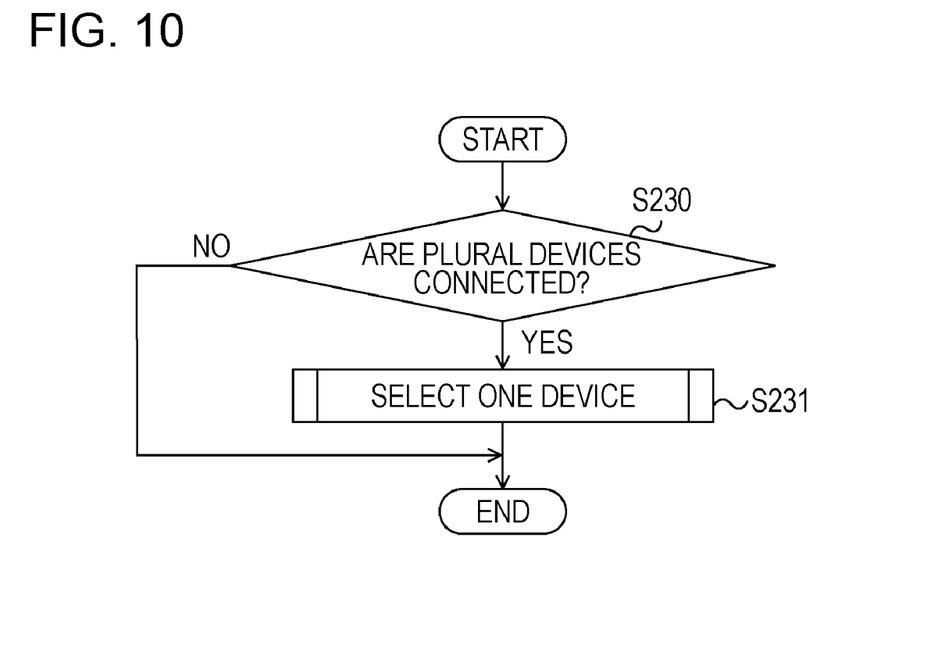
FIG. 10 is a flowchart illustrating operations in which a plurality of USB 2.0 devices are connected to the DWA for describing the present invention.

FIG. 10 is a flowchart illustrating operations executed in accordance with the control of the CPU 21 in which a plurality of USB 2.0 devices are connected to the DWA 500. It is noted that processes of FIG. 10 are added after the process of step S221 in FIG. 6 and the processes of FIG. 10 may be inserted between any processes from steps S201 to S207 of FIG. 5.

In step S230, the DWA 500 determines whether a plurality of USB 2.0 devices are connected to the DWA 500. If a plurality of USB 2.0 devices are not connected to the DWA 500, no operations are performed. If a plurality of USB 2.0 devices are connected to the DWA 500, the process advances to step S231. In step S231, the DWA 500 selects one device from among the plurality of USB 2.0 devices connected to the DWA 500. As a selection method of the DWA 500, the device may be selected or may be selected while depending on apparatus information of the devices as a reference. For example, a device having a high display performance, a device with low power consumption, etc.

According to the present embodiment, in addition to the effects of the previous embodiment, the plurality of USB 2.0 devices can be connected to the DWA 500. In other words, even when the plurality of USB 2.0 devices are connected to the DWA 500, it is possible to perform the secret key exchange based on the Numeric Model of the WUSB by using the USB 2.0 device selected from among the plurality of USB 2.0 devices.

Figure 11:
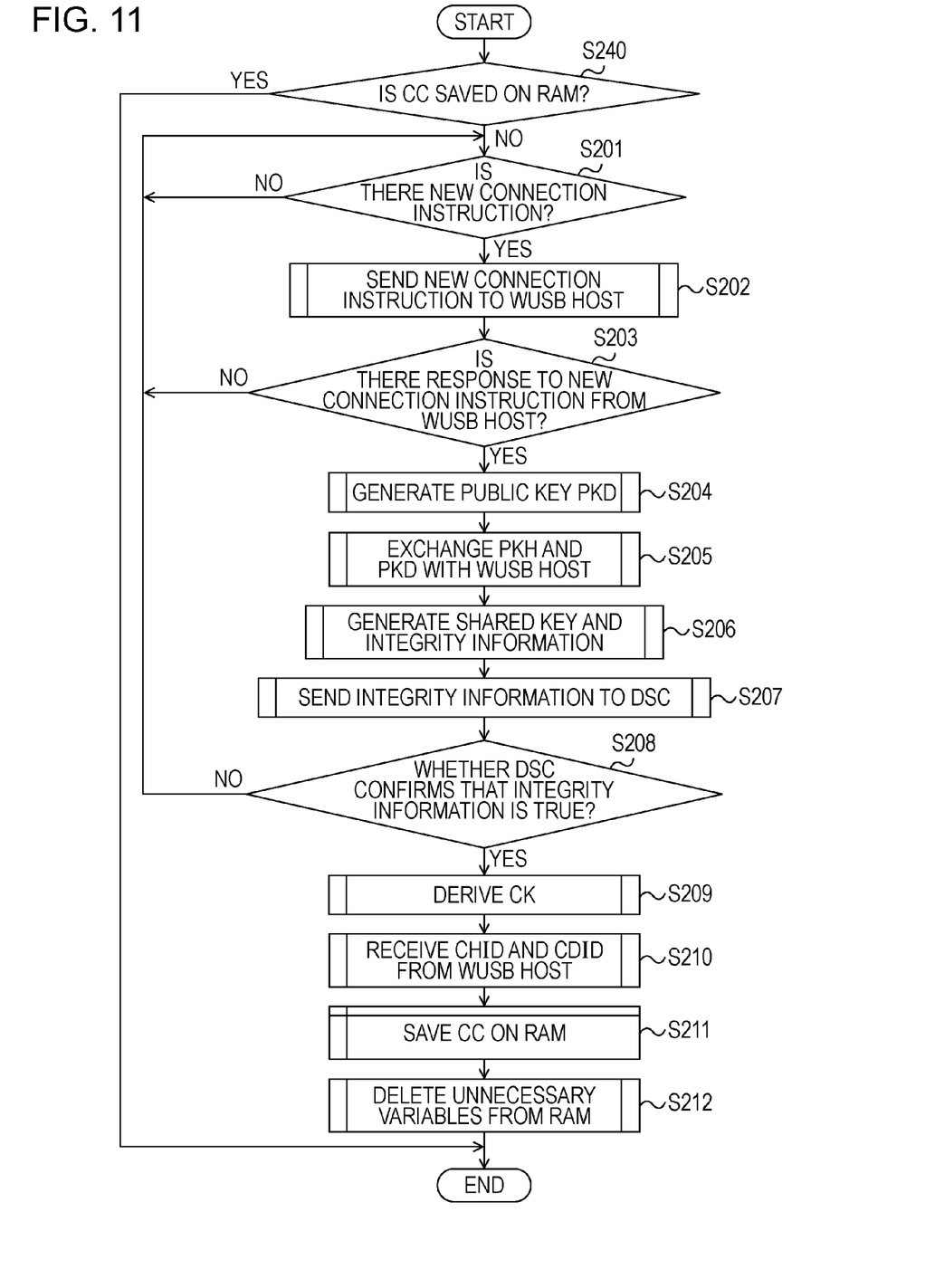
FIG. 11 is a flowchart illustrating operations of the DWA for describing the present invention.

FIG. 11 is a flowchart illustrating operations of the DWA 500 according to a third exemplary embodiment. The configurations and operations of the DWA 500 in the present embodiment are similar to those in the previous embodiments.

In step S240, the DWA 500 determines whether the CC shared with the WUSB host 200 is temporarily stored in the RAM 120. If the CC is not stored, the DWA 500 performs the processes from steps S201 to S212 illustrated in FIG. 5, and if the CC is stored, the DWA 500 does not perform these steps.

According to the present embodiment, in addition to the effects of the previous embodiments, once the processes described in these embodiments are performed, it is possible to perform the WUSB communication with the partner WUSB host who exchanges the secret key. Moreover, it is possible to avoid unnecessary processes like repeatedly performing the same processes with respect to the partner who has already performed the processes described in the previous embodiments.

The present invention can be achieved in the following manner. That is, a recording medium (storage medium) on which a program code of software for realizing the above-described exemplary embodiments is recorded is supplied to a system or an apparatus. Then, the program code stored on the recording medium is read and executed by a computer (or a CPU or an MPU) of the system or the apparatus. In this case, the program code itself read out from the recording medium realizes the functions of the above-described exemplary embodiments, and the recording medium on which the program code is recorded constitutes the present invention.

In addition, the present invention includes a case where as the program code read out by the computer is executed, a part or all of the actual processes are performed by an operating system (OS) running on the computer in accordance with an instruction of the program code and the process realizes the functions of the above-described exemplary embodiments.

Furthermore, the present invention includes a case where after the program code read out from the recording medium is written in a memory that is provided to a function expansion board inserted in the computer or a function expansion unit connected to the computer. After that in accordance with an instruction of the program code, a CPU or the like provided to the function expansion board or the function expansion unit performs a part or all of the actual processes and then the functions of the above-described exemplary embodiments are realized by the process.

In a case where the present invention is applied to the recording medium, the program code corresponding to the above-described flowcharts is stored on the recording medium.

According to each of the above-described exemplary embodiments, by adding the cooperation function between the communication apparatus having no display apparatus (for example, the DWA) and the external display apparatus connected to the communication apparatus, it is possible to cope with the Numeric Association model even when the communication apparatus does not have a display function. With this configuration, the cost reduction can be achieved while improving the usability of the wireless connection. In addition, it is unnecessary to mount the USB 2.0 device controller for the Cable Model and an up stream connector, thus reducing the costs.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-257702 filed Sep. 22, 2006, which is hereby incorporated by reference herein in its entirety.

What is claimed is:

1. A communication system, the system comprising:
a control apparatus;
a communication apparatus; and
a display apparatus;
the control apparatus comprising:
a first generation unit configured to generate a first encryption key and first integrity information for validating the first encryption key;
a first display control unit configured to display the first integrity information on a first display unit of the control apparatus;
a first communication unit configured to perform communication with the communication apparatus based on the first encryption key,
the communication apparatus comprising:
a first connecting unit configured to connect to the display apparatus with a cable;
a second generation unit configured to generate a second encryption key and second integrity information for validating the second encryption key;
a second display control unit configured to notify the display apparatus of the second integrity information for having the display apparatus connected by the first connecting unit and display the second integrity information;
a first determination unit configured to determine whether the second integrity information displayed on the display apparatus matches the first integrity information displayed on the first display unit of the control apparatus, based on a notification from the display apparatus; and
a second communication unit configured to perform wireless communication with the control apparatus based on the second encryption key when the second integrity information matches the first integrity information, and
the display apparatus comprising:
a second connecting unit configured to connect with the communication apparatus with the cable;
a second display unit configured to display the second integrity information notified from the communication apparatus;
an input unit configured to input a confirmation result by a user that confirms whether the second integrity information displayed on the second display unit of the display apparatus matches the first integrity information displayed on the first display unit of the control apparatus; and
a notifying unit configured to notify the confirmation result by the user in accordance with an input through the input unit to the communication apparatus.

2. A communication apparatus, comprising:
a communication unit configured to perform a wireless communication with a communication partner apparatus that generates a first encryption key and first integrity information for validating the first encryption key and displays the first integrity information on a first display unit of the communication partner apparatus;
a connection unit configured to connect to a display apparatus with a cable;

a generation unit configured to generate a second encryption key and second integrity information for validating the second encryption key;

a display control unit configured to notify the display apparatus of the second integrity information for having a second display unit of the display apparatus connected by the connection unit and display the second integrity information; and a determination unit configured to determine whether the second integrity information displayed on the display apparatus matches the first integrity information displayed on the first display unit of the communication partner apparatus, based on a notification from the display apparatus, wherein the communication unit performs encryption communication with the communication partner apparatus based on the second encryption key when the second integrity information matches the first integrity information.

3. The communication apparatus according to claim 2, wherein the generation unit comprises:

a public key generation unit configured to generate a public key;

a public key exchange unit configured to exchange the public key with the communication partner apparatus;

a shared key generation unit configured to generate a shared key from the public key; and a secret key generation unit configured to generate a secret key from the shared key, wherein the second integrity information is information for confirming the integrity between the shared key generated by the shared key generation unit and a shared key generated by the communication partner apparatus, and wherein the communication unit performs the communication with the communication partner apparatus by using the secret key generated by the secret key generation unit.

4. The communication apparatus according to claim 2, further comprising a second generation unit configured to generate the secret key from the second encryption key, wherein the second generation unit generates the secret key when the second integrity information displayed on the second display unit of the display apparatus matches the first integrity information displayed on the first display unit of the communication partner apparatus.

5. The communication apparatus according to claim 2, further comprising a selection unit configured to select the display apparatus that displays the second integrity information from among a plurality of display apparatuses connected to the connection unit.

6. The communication apparatus according to claim 2, further comprising a decision unit configured to determine whether the secret key is provided, wherein the communication apparatus operates the display control unit and the determination unit and executes a process for generating a secret key when the decision unit determines that the secret key is not provided.

7. A method for communicating in a communication system, the method comprising:

using a processor to execute the following steps:

generating a first encryption key and first integrity information for validating the first encryption key;

displaying the first integrity information on a first display unit of a control apparatus;

communicating based on the first encryption key;

connecting to a display apparatus that displays the first integrity information with a cable;

generating a second encryption key and second integrity information for validating the second encryption key;

notifying the display apparatus of the second integrity information for having the display apparatus displaying the second integrity information;

determining whether the second integrity information displayed on the display apparatus matches the first integrity information displayed on the first display unit of the control apparatus based on a notification from the display apparatus; and communicating wirelessly with the control apparatus based on the second encryption key when the second integrity information matches the first integrity information;

connecting with a communication apparatus with the cable;

displaying the second integrity information;

inputting a confirmation result by a user that confirms whether the second integrity information displayed on a second display unit of the display apparatus matches the first integrity information displayed on the first display unit of the control apparatus; and notifying the confirmation result by the user in accordance with inputted determination information.

8. A non-transitory computer-readable storage medium storing computer-executable process steps, the computer-executable process steps causing a computer to execute the method of claim 7.

9. A method for communicating performed in a communication apparatus, the method comprising:

using a processor to execute the following steps:

communicating wirelessly with a communication partner apparatus that generates a first encryption key and first integrity information for validating the first encryption key and displays the first integrity information on a first display unit of the communication partner apparatus;

connecting to a display apparatus with a cable;

generating a second encryption key and second integrity information for validating the second encryption key;

notifying the display apparatus of the second integrity information for having the display apparatus displaying the second integrity information;

determining whether the second integrity information displayed on the display apparatus matches the first integrity information displayed on the first display unit of the communication partner apparatus, based on a notification from the display apparatus; and performing an encryption communication with the communication partner apparatus based on the second encryption key when the second integrity information matches the first integrity information.

10. A non-transitory computer-readable storage medium storing computer-executable process steps, the computer-executable process steps causing a computer to execute the method of claim 9.

* * * * *